United States Patent Office 3,597,422
Patented Aug. 3, 1971

3,597,422
PYRAZINOISOINDOLES AND A METHOD FOR THEIR PREPARATION
Martin Winn, Waukegan, Ill., assignor to Abbott Laboratories, North Chicago, Ill.
No Drawing. Filed Apr. 10, 1969, Ser. No. 815,212
Int. Cl. C07d 51/72
U.S. Cl. 260—268TR 3 Claims

ABSTRACT OF THE DISCLOSURE

Potassium amide in liquid ammonia effects a novel ring contraction with 2,5-benzodiazocines to yield isoindoline and isoindoles.

--- wherein R is hydrogen or chlorine and to the novel ring contraction reaction by which the compound wherein R is hydrogen may be prepared. The compounds are useful as fungicides and in particular inhibit the growth of *C. Globosum*.

The reactions may be represented as shown in Table I. The starting 2,5-benzodiazocines (1a, 1b) may be prepared according to the procedure of Sulkowski et al., J. Org. Chem. 32, 2180 (1967). The following example will illustrate the method of this invention. The characters underlined refer to the structures shown in Table I.

TABLE I
Rearrangement of benzodiazocines to isoindoles and isoindolines

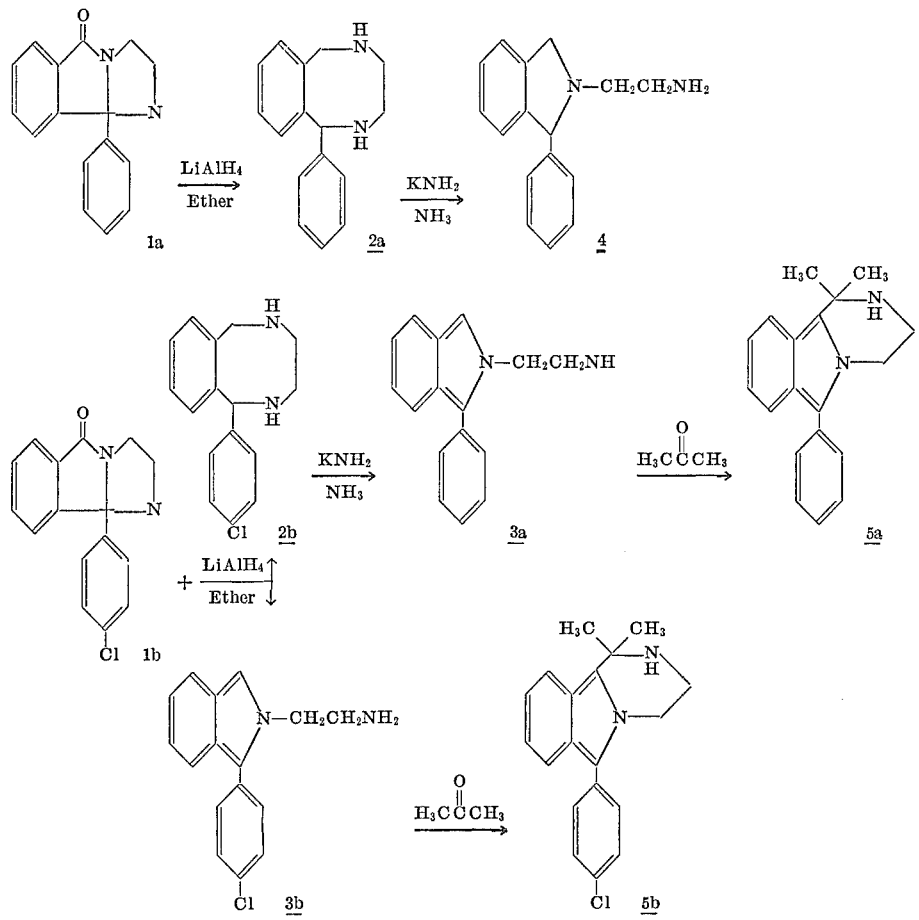

This invention is directed to compounds of the formula

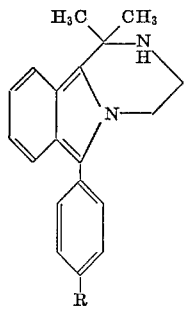

EXAMPLE 1

1 - (p - chlorophenyl)-1,2,3,4,5,6-hexahydro-2,5-benzodiazocine (2) and 2-(2-aminoethyl) - 1 - (p-chlorophenyl)isoindole (3b)

Reduction of 1b (100 g.) was carried out with lithium aluminum hydride in ether according to the procedure of Sulkowski et al., supra. There was obtained 43.9 g. of 2b M.P. 106–108° and 7.0 g. of solid M.P. 95–105°. The mother liquors were then distilled to give 30.2 g. (32%) of an oil B.P. 185–190° (0.1 mm.). The NMR spectrum indicated that this was mostly 3b contaminated by about 10% of 2a. It was used directly to prepare 5b as shown in Example 6.

EXAMPLE 2

1 - phenyl-1,2,3,4,5,6-hexahydro-2,5-benzodiazocine (2a) and o-(2-aminoethyl)-1-phenylisoindole (3a)

The procedure of Example 1 was repeated with 1a and there was obtained 44.3 g. of 2a M.P. 126–128 and 25.5 g. of crude 3a B.P. 145–150 (0.2 mm.). It could not be crystallized and was used directly to prepare 5a as shown in Example 5. The ring contraction reaction with potassium amide is illustrated by the following examples.

EXAMPLE 3

2-(2-aminoethyl)-1,3-dihydro-1-phenylisoindole (4)

The benzodiazocine 2a (30.0 g.) was added to a 500 ml. solution of potassium amide in liquid ammonia prepared from 12.0 g. of potassium metal and 0.1 g. of ferric nitrate. The red solution was stirred for 4 hrs. at reflux temperature, the ammonia was evaporated, and ether was added. The ether layer was distilled after drying to give 24.0 g. (80%) of a liquid, B.P. 148–151° (0.2 mm.), M.P. 47–51°, (lit[2] M.P. 53°), dihydrochloride M.P. 213°–216° (i-PrOH), lit[2] M.P. 215°–220°. The NMR spectrum matched that given by W. Metlesics et al., J. Org. Chem., 32, 2185 (1967) and showed the absence of starting material.

EXAMPLE 4

2-(2-aminoethyl)-1-phenylisoindole (3a)

The benzodiazocine 2b (22.6 g.) was treated with potassium amide in liquid ammonia as in the procedure of Example 3. There was obtained 14.4 g. (64%) of an oil B.P. 180–183° (0.2 mm.) which did not crystallize. It gave a positive Ehrlich test (J. Amer. Chem. Soc., 86, 4152 (1964), (p-dimethylaminobenzaldehyde and acetic acid) and was converted into a tar with hydrochloric acid. NMR spectrum $(CDCl_3) \delta$ 0.86 (s., 2, $NH_2$), 3.49 (t., 2, J=6 Hz., $CH_2$), 4.21 (t., 2, J=6 Hz., $CH_2$), 6.8–7.1 (m., 2), 7.22 (s., 1) and 7.3–7.9 P.P.M. (m., 7).

*Analysis.*—Calcd. for $C_{16}H_{16}N_2$ (percent): C, 81.32; H, 6.82; N, 11.85. Found (percent): C, 81.37; H, 6.70; N, 11.82; Cl, 0.00.

The cyclization reaction with acetone is illustrated by the following examples.

EXAMPLE 5

1-1-dimethyl-6-phenyl-1,2,3,4-tetrahydropyrazino-[2,1-a]isoindole (5a)

2-(2-aminoethyl)-1-phenylisoindole from Example 2 (6.20 g.) was dissolved in 25 ml. of acetone. Heat was evolved and crystals formed. The mixture was cooled and filtered to give 4.70 g. (65%) of 5a M.P. 146–148; NMR $(CDCl_3)\delta$ 1.52 (s., 1, NH), 1.85 (s., 6, $(CH_3)_2$), 3.15 (m., 2, $CH_2$), 4.11 (m., 2, $CH_2$), 6.8–7.1 (m., 2) and 7.3–7.9 p.p.m. (m., 7); $UV_{max}$ (dioxane) 365 m$\mu$ (log $\epsilon$=3.59), 335 m$\mu$ (log $\epsilon$=3.44). The reported [3] ultraviolet maxima for 1-phenylisoindole are 357 m$\mu$ (10 g. $\epsilon$=3.10), 325 m$\mu$ (10 g. $\epsilon$=2.99).

*Analysis.*—Calcd. for $C_{19}H_{20}N_2$ (percent): C, 82.64; H, 7.24; N, 10.12. Found (percent): C, 82.70; H, 7.20; N, 10.05.

EXAMPLE 6

1-1-dimethyl-6-(p-chlorophenyl)-1,2,3,4-tetrahydropyrazino[2,1-a]isoindole (5b)

The crude 2 - (2-aminoethyl)-1-(p-chlorophenyl)isoindole from Example 1 (6.70 g.) was treated as above giving 5.10 g. (66%) of 5b M.P. 169–173°. Spectral properties were similar to 5a.

*Analysis.*—Calcd. for $C_{19}H_{19}ClN_2$ (percent): C, 73.45; H, 6.12; N, 9.02. Found (percent): C, 73.52; H, 6.22; N, 9.09.

The fungicidal properties of the compounds of this invention are illustrated in the following test.

EXAMPLE 7

A sample of *Chaetomium globosum*, a mold destructive of cellulose, was slant grown at 28° C. on a starvation medium (4% dextrose, 1% yeast extract and 1.5 grams agar/liter of water) was scraped and suspended in approximately 2 ml. Saboraud's broth. The spore suspension was adjusted to equal the number one McFarland Standard nephlometer tube using Saboraud's broth as a diluent. A test medium was prepared from Saboraud's liquid nutrient medium with 1.5% agar added which was then autoclaved for 15 minutes at 15 pound pressure. This medium was added to sterile petrie dishes and sufficient test compound added to give a final concentration of 1000 parts per million, in 100 parts per million. Cotton swabs were used to streak the inoculum on the plates which were incubated for three days at 28° C. and read for growth or absence of growth of the mold. Those dishes containing 1000 parts per million of the test compound showed substantially no mold growth.

Having thus described the invention, I claim:

1. A 1,1 - dimethyl-6-R-1,2,3,4-tetrahydropyrazino[2,1-a]isoindole where R is a member selected from the group consisting of phenyl and chlorophenyl.

2. The compound of claim 1 wherein R is p-chlorophenyl.

3. The process of preparing a 2-(2-aminoethyl)-1-phenylisoindole by a reaction which comprises the steps of refluxing a compound of the formula

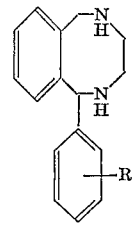

wherein R is hydrogen or chlorine with potassium amide in liquid ammonia for a period of time sufficient to effect contraction of the benzodiazocine ring.

References Cited

Winn et al., Jour Org. Chem., vol. 33, pp. 3779–83 (1968).

Winn et al., Jour Org. Chem. vol. 34, pp. 249–50 (1969).

DONALD G. DAUS, Primary Examiner

U.S. Cl. X.R.

260—239, 250, 309.7, 326.1; 424—250